(12) United States Patent
Tolbert, Jr. et al.

(10) Patent No.: US 9,279,425 B2
(45) Date of Patent: Mar. 8, 2016

(54) HERMETIC ELECTRICAL FEEDTHROUGH ASSEMBLY FOR A COMPRESSOR

(71) Applicant: BRISTOL COMPRESSORS INTERNATIONAL INC., Bristol, VA (US)

(72) Inventors: John W. Tolbert, Jr., Bristol, TN (US); Scott G. Hix, Bristol, VA (US); David R. Gilliam, Bristol, VA (US); Joseph A. Newland, Limestone, TN (US); Doug Blankenship, Bristol, TN (US)

(73) Assignee: Bristol Compressors Interntional, Inc., Bristol, VA (US)

(*) Notice: Subject to any disclaimer, the term of this patent is extended or adjusted under 35 U.S.C. 154(b) by 172 days.

(21) Appl. No.: 14/048,027

(22) Filed: Oct. 7, 2013

(65) Prior Publication Data

US 2014/0065000 A1    Mar. 6, 2014

Related U.S. Application Data

(63) Continuation-in-part of application No. 12/843,429, filed on Jul. 26, 2010, now Pat. No. 8,552,293.

(60) Provisional application No. 61/726,672, filed on Nov. 15, 2012, provisional application No. 61/726,676, filed on Nov. 15, 2012.

(51) Int. Cl.
| | |
|---|---|
| *H05K 5/06* | (2006.01) |
| *F04C 18/02* | (2006.01) |
| *H02G 3/22* | (2006.01) |
| *H02G 15/013* | (2006.01) |

(52) U.S. Cl.
CPC .............. *F04C 18/0207* (2013.01); *H02G 3/22* (2013.01); *H02G 15/013* (2013.01)

(58) Field of Classification Search
USPC .............................. 174/50.5, 50.55, 655, 659
See application file for complete search history.

(56) References Cited

U.S. PATENT DOCUMENTS

| | | | | |
|---|---|---|---|---|
| 5,584,716 A | * | 12/1996 | Bergman | 439/282 |
| 6,995,316 B1 | * | 2/2006 | Goto | 174/659 |
| 8,552,293 B2 | * | 10/2013 | Tolbert, Jr. | 174/50.5 |

* cited by examiner

*Primary Examiner* — Dhirubhai R Patel
(74) *Attorney, Agent, or Firm* — Montgomery Fazzone PLLC (57) ABSTRACT

An electrical feedthrough assembly for providing connection to components of a compressor includes a housing having an inner surface defining a channel. A sealed wire assembly is provided in the channel. The sealed wire assembly includes a body having an outer surface and a plurality of wires sealingly passing through the body.

5 Claims, 10 Drawing Sheets

HERMETIC ELECTRICAL FEEDTHROUGH ASSEMBLY FOR A COMPRESSOR

CROSS-REFERENCE TO RELATED APPLICATIONS

This application is a continuation-in-part of U.S. application Ser. No. 12/843,429, filed Jul. 26, 2010, entitled HERMETIC ELECTRICAL FEEDTHROUGH ASSEMBLY FOR A COMPRESSOR AND METHOD FOR MAKING THE SAME, now issued as U.S. Pat. No. 8,552,293 on Oct. 8, 2013, and this application claims the benefit of U.S. Provisional Application No. 61/726,672, filed Nov. 15, 2012, entitled HERMETIC ELECTRICAL FEEDTHROUGH ASSEMBLY FOR A COMPRESSOR, and U.S. Provisional Application No. 61/726,676, filed Nov. 15, 2012, entitled SYSTEMS AND COMPRESSORS USING FLAMMABLE REFRIGERANT, all of which Applications are incorporated by reference herein in their entirety.

BACKGROUND

The application generally relates to electrical connections for compressors. The application relates more specifically to providing electrical connections through the shell or housing of a hermetic compressor.

Figure 1:
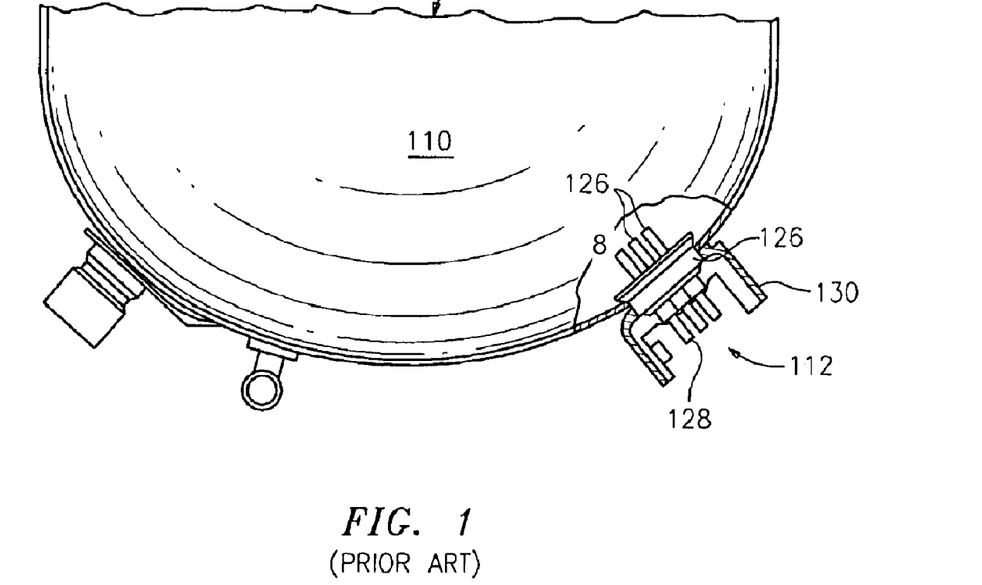
FIG. 1 shows a top, partial cross-sectional view of a prior art compressor.

FIG. 1 shows a top, partial cross-sectional view of a prior art compressor 100. The compressor 100 has a shell 110 that provides a hermetically sealed environment for electrical and mechanical components inside the shell 110. To maintain proper operation of the compressor 100, the integrity of the hermetically sealed environment cannot be breached by the electrical connections through the shell 110. Further, when a flammable refrigerant is used in the compressor 100 as the working fluid, any sparking or arcing inside the compressor 100 should be avoided.

One type of electrical connection into the hermetically sealed environment of the shell 110 can be provided by a power terminal 112. The power terminal 112 has to maintain the hermetically sealed environment while withstanding the harsh operating conditions associated with the compressor 100. The power terminal 112 can be located within an aperture in the shell 110. The power terminal 112 can have a cup-shaped metal collar 126 with a bottom wall. The bottom wall has holes that permit conductor pins 128 to pass through to provide the electrical connection through the shell 110. The collar 126 is sealed in the shell aperture by welding and the pins 128 are sealed within the collar 126 by fused glass insulation. To further stabilize the terminal 112, the fused glass insulation surrounding the pins 128 can be covered with epoxy or shielded by ceramic collars.

A fence 130 can surround and protect the power terminal 112. A molded plug (not shown) can be configured to couple with the fence 130 and, thereby, make an electrical connection with the pins 128 outside the shell 110. To accomplish this connection on the outside of the shell, the pins 128 can be provided with a tab (not shown). For example, each pin 128 may include an attached, e.g., welded, 0.250 inch tab that can connect to a 0.250 inch spade connector crimped onto the end of a voltage supply wire or conductor. Any of the previously described connections, e.g., pin-tab, tab-connector, connector-wire, can become corroded or loose and result in arcing or sparking that can ignite the surrounding atmosphere if the compressor 100 is located in a hazardous or explosive environment, such as grain silos with grain dust, areas with gasoline vapors, mines, etc.

In addition, the power terminal 112 relies on through air and/or over surface clearance to insulate the terminal pins both line to line and each line to ground, where the shell 110 and/or collar or terminal body 126 are at earth ground potential. Even if the connections and insulation are sound, there can be multiple ways for an arc or spark to occur at the terminal pins 128 when the pins 128 are energized. For example, a conductive atmosphere (e.g., contaminants and/or moisture) could reduce the dielectric (insulation properties) between pins 128 and bridge the voltage. Another example is that an excessive grid voltage could produce corona or other micro conductivity that could also reduce the dielectric between pins 128. A further example is that insects or small wildlife can bridge the voltage between pins 128. A service person may also inadvertently bridge the voltage between pins 128 with tools or other items while performing maintenance with the terminal cover removed.

Plugs, tabs, connectors or wires similar to those used on the outer ends of the pins 128 can be used on the inside end of the pins 128 to accomplish the electrical connection between the electrical components inside the shell 110 and the power terminal 112. When using a flammable refrigerant, the connection(s) at the inner end of the pins 128 should not generate a spark or arc due to the risk of fire or explosion inside the shell 110.

There can be problems associated with the use of sealed glass pin power terminals 112. The terminals 112 require extensive tooling that is costly and not easily modified to add or subtract pins 128 if additional or fewer electrical connections are required. The prefabrication process is costly, complex and time consuming. Further, as the terminals 112 are being welded to the shell 110, the glass seals can be damaged and, thus, the assembly must be discarded and replaced. The replacement of the assembly can be quite costly as significant time and expense has already been invested in pre-assembling the power terminal 112. Even worse, the damaged glass seals may go undetected, resulting in an eventual compressor failure. Further, the plug and the corresponding electrical connections may become loose resulting in a compressor failure. The additional parts and complexity needed to connect to the pins 128 can add cost and create additional junctions that may fail.

Therefore, what is needed is an electrical connection through the shell of a hermetic compressor that can be easily assembled and installed and that reduces the possibility of sparking or arcing inside or outside of the compressor shell.

SUMMARY

The present application is directed to an electrical feedthrough assembly for providing a connection to the internal components of a compressor. The electrical feedthrough assembly includes a housing having an inner surface defining a channel. A sealed wire assembly is provided in the channel. The sealed wire assembly includes a body having an outer surface defining at least one groove and a plurality of wires sealingly passing through the body. An o-ring fits in the groove(s) to provide a hermetic seal between the body and the inner surface of the housing.

The present application is directed to a compressor including a shell defining an opening. A weld housing has an outer surface hermetically welded in the opening. The weld housing forms an elongated channel to hold a sealed wire assembly. The sealed wire assembly includes a body having an outer surface defining a groove and wires sealingly passing through the body. An o-ring is disposed in the groove to provide a hermetic seal between the body and the weld housing.

The present application also includes a compressor including a shell defining an opening and a wire assembly hermetically sealed in the opening. The wire assembly includes a body and wires passing through the body, wherein the body is an epoxy material that hermetically seals the wires directly therein without additional components. The body can have an outer surface defining at least one groove that receives an o-ring. Additionally, the compressor may have a housing with an outer surface hermetically secured to the opening and an inner surface defining an elongated channel for receiving the wire assembly.

One advantage of the present application is that it can effectively provide a connection to the compressor components yet maintain the integrity of the compressor shell through harsh conditions such as swings in vacuum and pressure.

Another advantage of the present application is that it simplifies the assembly of compressors and the compressor components by eliminating the glass sealed power terminals.

A further advantage of the present application is that it provides an electrical connection that can accommodate modifications such as additional wires.

Still another advantage of the present application is that the electrical connection is more resistant to water and moisture such as from precipitation and condensation.

Another advantage of the present application is that the electrical connection can be flexibly fabricated with larger or smaller sized wires, as needed, based on lower or higher amperage needs.

Other features and advantages of the present invention will be apparent from the following, more detailed description of the embodiments, taken in conjunction with the accompanying drawings which show, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE EMBODIMENTS

Figure 2:
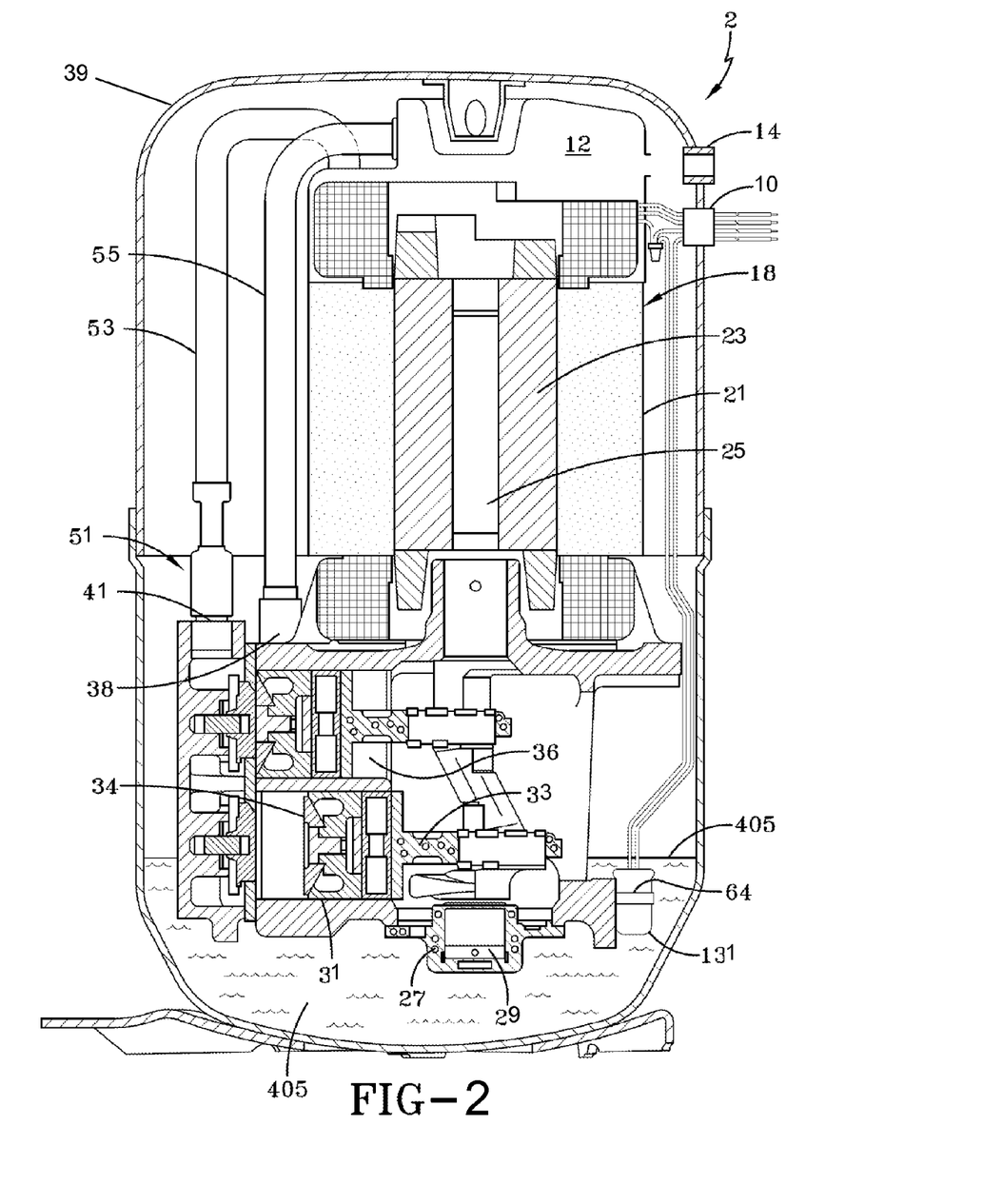
FIG. 2 shows an embodiment of a compressor using an embodiment of an electrical feedthrough assembly.

FIG. 2 shows an embodiment of a hermetic compressor. Compressor 2 may be connected to a refrigeration or heating, ventilation and air conditioning (HVAC) system (not shown) having, among other components, a condenser, expansion device and evaporator in fluid communication with the compressor 2. The compressor 2 is shown as a reciprocating compressor, but compressor 2 can be any suitable type of hermetic or semi-hermetic compressor including, but not limited to, a rotary compressor, scroll compressor, spool compressor, screw compressor, or centrifugal compressor. The compressor 2 can be connected to an evaporator (not shown) by a suction line that enters the suction port 14 of compressor 2. The suction port 14 can be in fluid communication with a suction plenum 12. Refrigerant gas from the evaporator enters the compressor 2 through the suction port 14 and then flows to the suction plenum 12 before being compressed. In one embodiment, the refrigerant gas from the suction port 14 can fill the interior space of the compressor housing before flowing to the suction plenum. Some examples of the refrigerant gas that may be used in compressor 2 are: hydrofluorocarbon (HFC) based refrigerants, for example, R-410A, R-407C, R-404A, R-134a and R-32 (a component of R410A and R407C); hydrofluoro olefin (HFO) refrigerants, also known as "unsaturated HFCs," such as R1234yf; inorganic refrigerants like ammonia (NH3), R-717 and carbon dioxide (CO2), R-744; hydrocarbon based refrigerants such as propane (R-290), isobutane (R-600a) or propene (R-1270), or any other suitable type of refrigerant. The hydrocarbon based refrigerants may be referred to as "flammable" refrigerants and can have an ASHRAE flammability class of 3. Other types of "flammable" refrigerants can include R-32, ammonia (R-717) and HFO refrigerants, each of which can have an ASHRAE flammability class of 2L.

The compressor 2 can use an electrical motor 18. As shown in FIG. 2, motor 18 is an induction motor having a stator 21 and a rotor 23, however any other suitable type of electrical motor may be used. A shaft assembly 25 extends through the rotor 23. The bottom end 29 of the shaft assembly 25 extends into an oil sump 405 and includes a series of apertures 27. Connected to the shaft assembly 25 below the motor is a compression device. As shown in FIG. 2, the compression device can be a piston assembly 31 that has two pistons. A connecting rod 33 is connected to a piston head 34, which moves back and forth within a cylinder 36. The cylinder 36 includes a gas inlet port 38 and a gas discharge port 41. Associated with these ports 38, 41 are associated suction valves and discharge valves. The gas inlet port 38 is connected to an intake tube 55, which is in fluid communication with the suction plenum 12.

The motor 18 can be activated by a signal in response to the satisfaction of a predetermined condition, for example, an electrical signal from a thermostat when a preset temperature threshold is reached. While a thermostat is used as an example, it should be known that any type of device or signal may be used to activate the compressor. When the compressor is activated, electricity is supplied to the stator 21, and the windings in the stator 21 cause the rotor 23 to rotate. Rotation of the rotor 23 causes the shaft assembly 25 to turn. When the shaft assembly 25 is turning, oil sump fluid in the oil sump 405 enters the apertures 27 in the bottom end 29 of the shaft and then moves upward through and along the shaft 25 to lubricate the moving parts of the compressor 2.

Rotation of the rotor 23 also causes reciprocating motion of the piston assembly 31. As the assembly 31 moves to an intake position, the piston head 34 moves away from gas inlet port 38, the suction valve opens and refrigerant fluid is introduced into an expanding cylinder 36 volume. The gas is pulled from the suction plenum 12 through the intake tube 55 to the gas inlet port 38 where the gas passes through the suction valve and is introduced into the cylinder 36. When the piston assembly 31 reaches a first end (or top) of its stroke, shown by movement of the piston head 34 to the right side of the cylinder 36 of FIG. 2, the suction valve closes. The piston head 34 then compresses the refrigerant gas by reducing the cylinder 36 volume. When the piston assembly 31 moves to a second end (or bottom) of its stroke, shown by movement of piston head 34 to the left side of cylinder 36 of FIG. 2, a discharge valve is opened and the compressed refrigerant gas is expelled through the gas discharge port 41. The compressed refrigerant gas flows from the gas discharge port 41 into a muffler 51 then through an exhaust or discharge tube 53 to exit the compressor 2 into a conduit connected to a condenser.

The motor 18 can be positioned within the top portion of the compressor 2, and the piston assembly 31 can be positioned below the motor 18. The oil sump 405 can be located at the bottom portion of the compressor 2. In one embodiment, a portion of the piston assembly 31 can be submerged below the oil level in the oil sump 405. When the compressor is not operating, some of the refrigerant in compressor 2 may condense and fall by force of gravity into the oil sump 405 and mix with the oil in the oil sump 405 or be absorbed into the oil in the oil sump. The oil in the oil sump 405 is used to lubricate the mechanical portions of the compressor 2, such as shaft assembly 25. When liquid refrigerant mixes with the oil, the resulting liquid is a less effective lubricant. To avoid this problem, the oil sump fluid is heated with a heater 131 and the refrigerant is evaporated from the oil, leaving oil in the oil sump 405 to lubricate the components. The heater 131 can be positioned within the oil sump and mounted or secured to any suitable structure inside the compressor such as the piston assembly 31 or an interior surface of a compressor shell 39.

Power can be provided to the motor 18 and the heater 131, or any other electrical component inside the compressor shell 39, by use of an electrical feedthrough assembly 10. As shown in FIG. 2, the electrical feedthrough assembly 10 can be positioned in the top cylindrical portion of the compressor 2. However, in other embodiments, the electrical feedthrough assembly 10 can be positioned at any suitable location in the compressor shell 39.

The feedthrough assembly 10 can be used to provide power, control and/or communication signals to the compressor motor 18 and the heater 131. The feedthrough assembly 10 can eliminate all inside and outside terminal connections at the compressor shell 39 for the motor 18 and heater 131 by permitting the corresponding power and control conductors or wires to pass through the compressor shell 39 without interruption, i.e., a continuous conductor or wire is used. In addition to the elimination of the terminal connections, the power terminal fences, fence covers, and cover gaskets can also be eliminated with the use of the feedthrough assembly 10. A weld housing 20 (see FIG. 3) of the feedthrough assembly 10 is welded or brazed or otherwise suitably secured into the compressor shell 39 (see FIG. 7) during fabrication and is then later used to house a sealed wire assembly 40. The sealed wire assembly 40, with its embedded wires or conductors, can be connected into the motor stator 21 and the heater 131 during fabrication. Upon placement of the stator 21 and heater 131 in the compressor 2, the sealed wire assembly 40 can be pulled through the weld housing 20 to a stop position incorporated into the weld housing 20. A snap ring device or other suitable mechanism or technique can then be used to secure the sealed wire assembly 40 in the weld housing 20.

Figure 3:
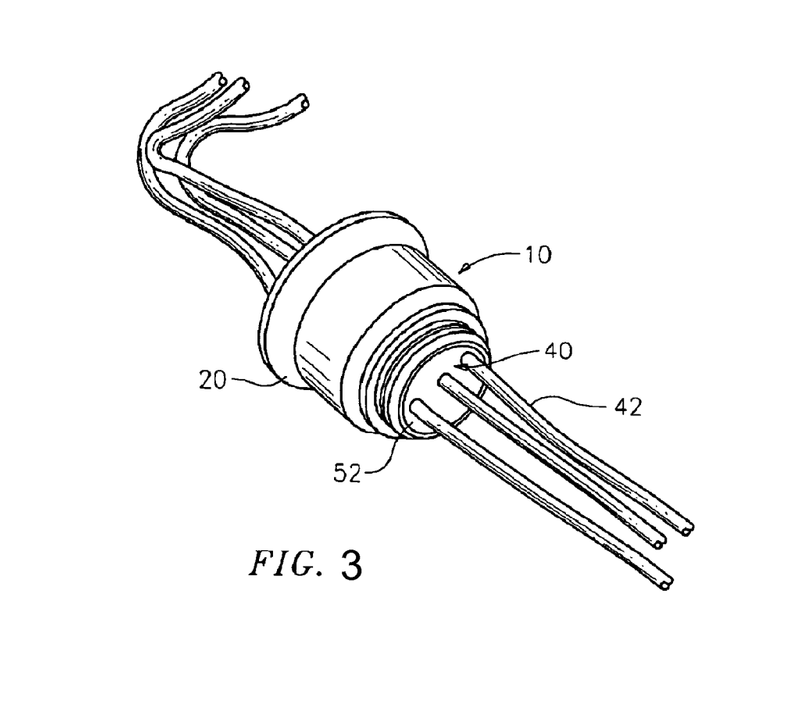
FIG. 3 shows an outer perspective view of an embodiment of an electrical feedthrough assembly for a compressor.
Figure 4:
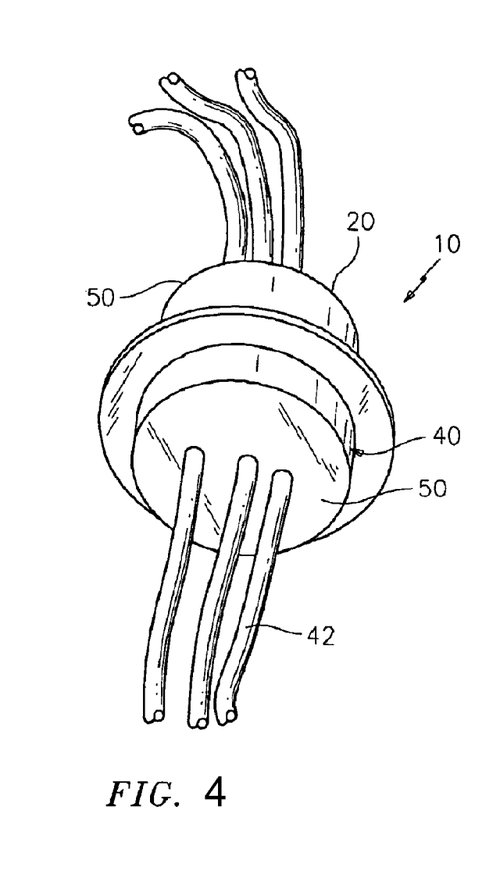
FIG. 4 shows an inner perspective view of the electrical feedthrough assembly of FIG. 3.

FIGS. 3 and 4 show outer and inner perspective views, respectively, of an embodiment of an electrical feedthrough assembly 10 for a compressor. The feedthrough assembly 10 includes a weld housing 20 and a sealed wire assembly 40 hermetically sealed and retained within the weld housing 20. The outer surface of the weld housing 20 can be hermetically welded within an opening of a compressor shell (see FIG. 7). One or more wires 42 (3 wires are shown in FIGS. 3 and 4) can extend through the wire assembly 40 to interconnect electrical components within the compressor shell with electrical components outside the compressor shell. The wires 42 can be used to send high voltage and/or low voltage signals, i.e., power and/or control signals, through the compressor shell. In another embodiment, one of the wires 42 can be ribbon cable.

Figure 5:
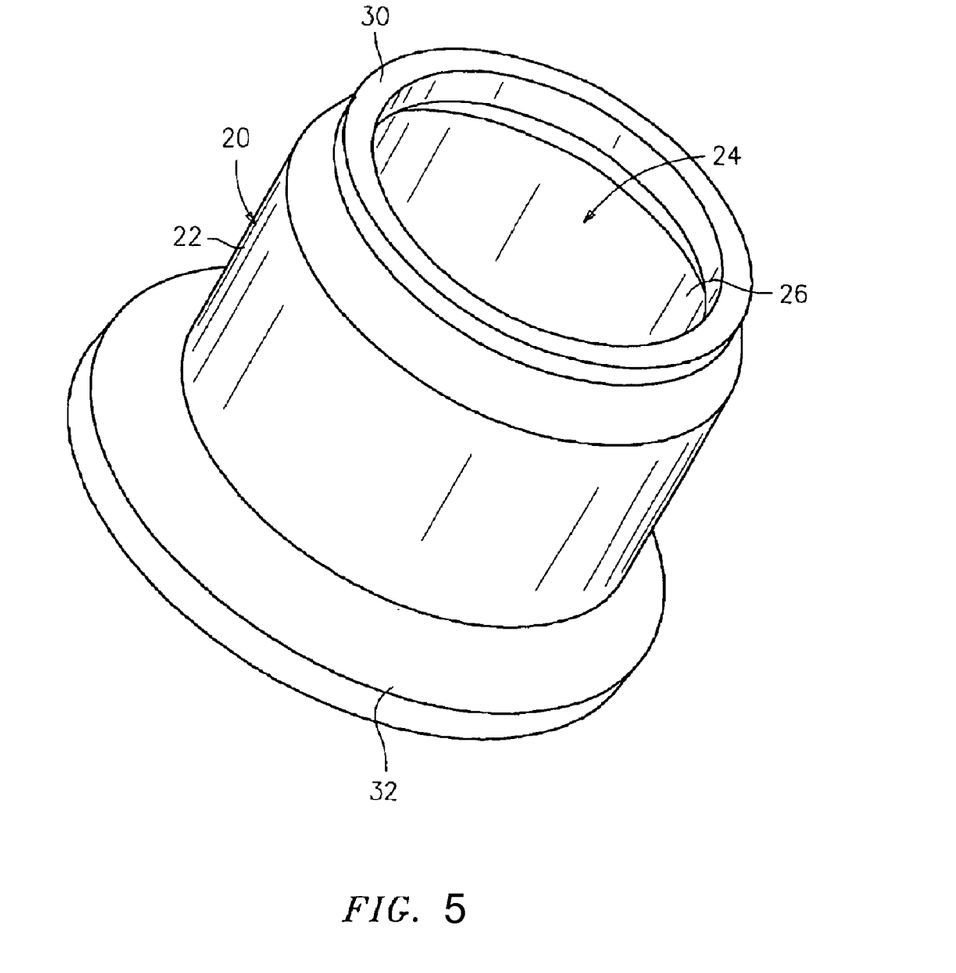
FIG. 5 shows a perspective view of an embodiment of a weld housing for the electrical feedthrough assembly of FIG. 3.
Figure 6:
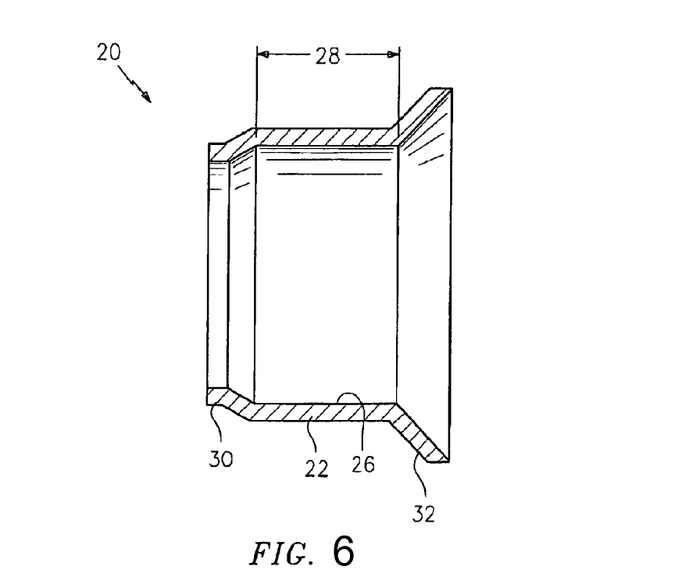
FIG. 6 shows a side, cross-sectional view of the weld housing of FIG. 5.
Figure 7:
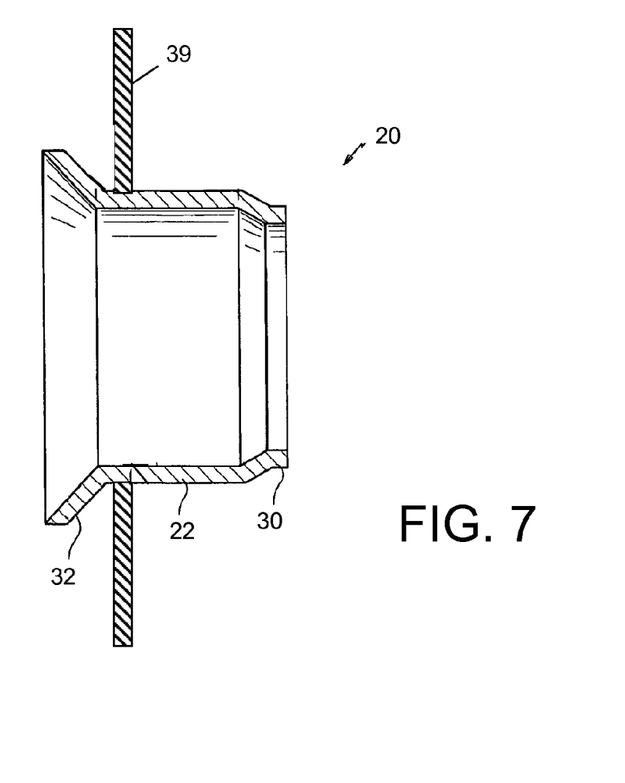
FIG. 7 shows an embodiment of a side, cross-sectional view of a weld housing mounted in a compressor shell.

FIGS. 5 and 6 show perspective and side cross-sectional views, respectively, of the weld housing 20. The weld housing 20 has a substantially cylindrical central portion 22 that defines an inner channel 24. The length 28 of the inner channel 24 is relatively longer than the thickness of a compressor shell and/or the bottom wall of a traditional metal collar. Thus, the inner channel 24 provides significantly more surface area 26 for the wire assembly 40 to seal against. The outer neck 30 of the weld housing 20 narrows in diameter by way of a shoulder portion from the diameter of central portion 22 to permit the wire assembly 40 to be retained against the shoulder portion of the outer neck 30 by the internal pressure of the compressor. The inner end 32 of the weld housing 20 has a conical shape that expands in diameter from the diameter of central portion 22. As a result, if the weld housing 20 were to become dislodged, the internal compressor pressure would hold the inner end 32 of the weld housing 20 against the compressor shell 39. As shown in FIG. 7, the weld housing 20 is welded into the opening in the compressor shell 39 by the central portion 22 adjacent inner end 32.

In one embodiment, the weld housing 20 can have a generally circular configuration for the inner channel 24. However, in other embodiments, the inner channel 24 of the weld housing 20 may be configured to have a shape such as a square, triangle, rectangle, or oval. The weld housing 20 can be formed from various materials such as plastic, polymer, glass, ceramic and/or metals, e.g., brass, aluminum, copper, stainless steel and steel. Similarly, the compressor shell could be formed from various materials such as plastic, ceramic and/or metals. If the compressor shell and/or weld housing are formed from a non-metallic material, different attachment techniques, e.g., adhesive, may need to be used to attach the weld housing to the compressor shell.

Figure 8:
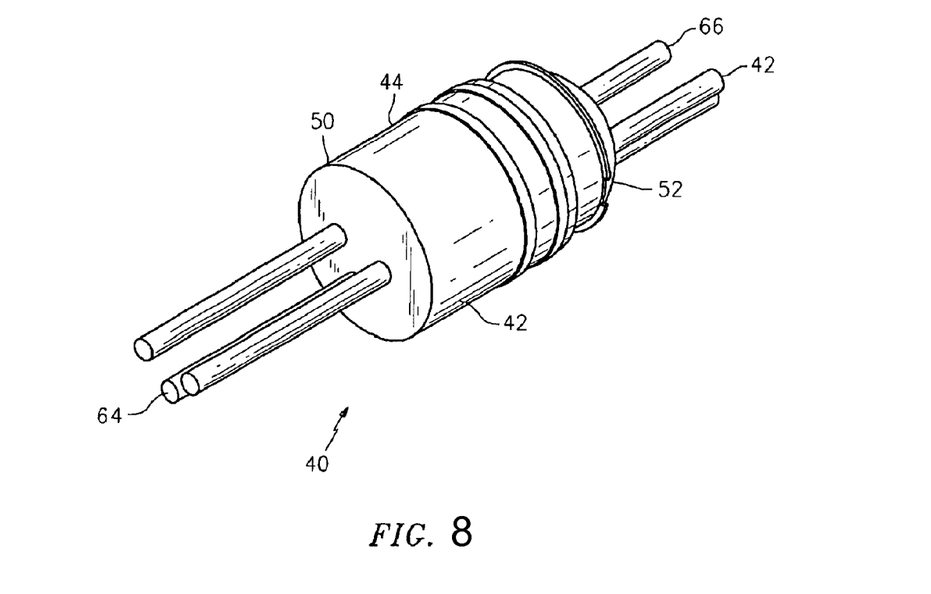
FIG. 8 shows a perspective view of an embodiment of a sealed wire assembly for the electrical feedthrough assembly of FIG. 3.
Figure 9:
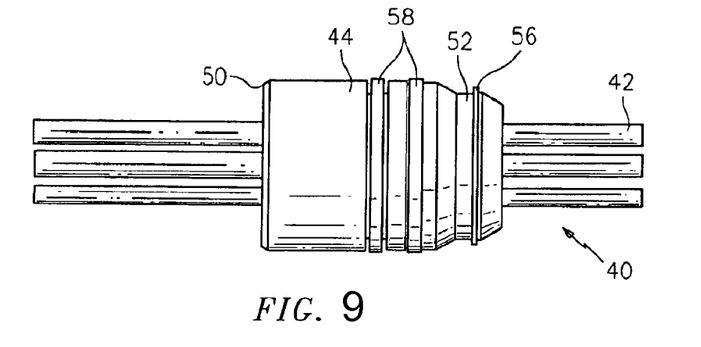
FIG. 9 shows a side view of the sealed wire assembly of FIG. 8.

FIGS. 8 and 9 show perspective and side views, respectively, of the sealed wire assembly 40, wherein the wire assembly 40 is ready to be inserted into the weld housing 20. As best seen in FIGS. 3 and 4, a body 44 of the wire assembly 40 is relatively longer than the weld housing 20 so that, when assembled, an inner portion 50 and an outer portion 52 of the body 44 extend from the weld housing 20. In one embodiment, the body 44 can have a length of 1.3 inches, but can be longer or shorter depending on the size of the weld housing 20 and other design factors. The outer portion 52 of the body 44 is shaped complimentarily to engage with the shoulder portion of the outer neck 30 of the weld housing 20.

Figure 10:
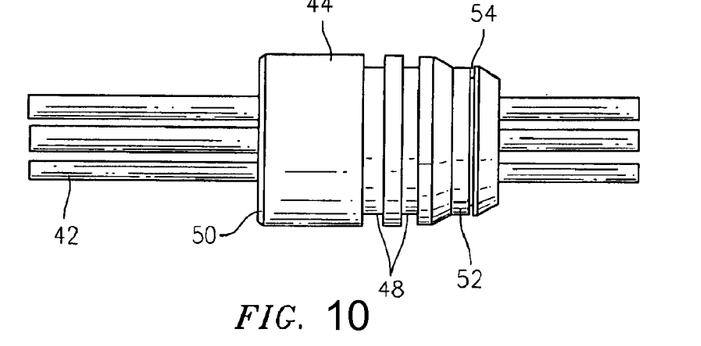
FIG. 10 shows a side view of the sealed wire assembly of FIG. 8 with the o-rings and snap ring removed.
Figure 11:
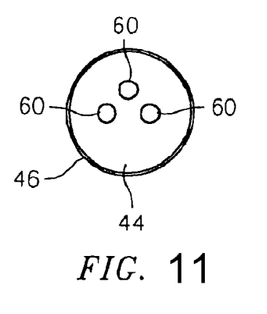
FIG. 11 shows an end view of the sealed wire assembly of FIG. 8.
Figure 12:
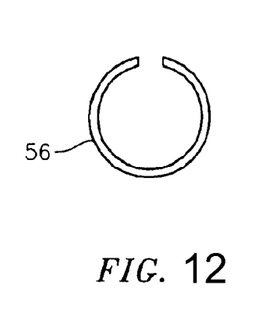
FIG. 12 shows a plan view of a snap ring for use on the body of the sealed wire assembly of FIG. 8.
Figure 21:
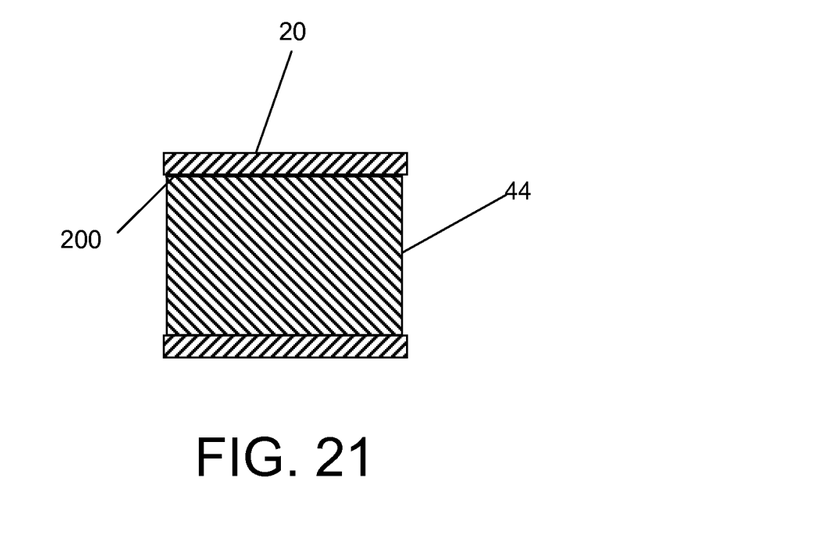
FIG. 21 shows a partial cross-sectional view of a threaded connection between a weld housing and a body.

FIG. 10 shows a side view of the sealed wire assembly of FIG. 8 with the snap ring or fastener 56 and o-rings 58 removed. The outer portion 52 includes a slot 54 for receiving the snap ring 56 as shown in FIG. 12. When disposed or positioned in the slot 54, the snap ring 56 prevents the body 44 from moving inward in the weld housing 20. The snap ring 56 can be carbon steel with an oil dip coating or stainless steel. However, in other embodiments, the snap ring 56 can be replaced with other suitable fastening devices such as tabs or nubs connected to the compressor shell 39 or weld housing 20 that can be bent against the body 44 to prevent axial movement of the body 44 or the addition of latches to the body 44 that can snap into the weld housing 20 to retain the body 44. In still further embodiments, the snap ring 56 and corresponding slot 54 may not be used to hold the body in the weld housing and alternative retention techniques and devices can be used. For example, the body 44 may have a threaded outer surface that can mate or engage with either a nut or similar fastener external to the weld housing 20 or that can mate or engage with a threaded inner surface of the weld housing 20 to form a threaded connection 200 (see FIG. 21). The threaded inner surface can extend over the entire inner surface of the weld housing 20 or can extend over a portion of the inner surface of the weld housing 20, e.g., the inner surface of the outer neck 30. Similarly, the threaded outer surface can extend over the entire outer surface of the body 44 or can extend over a portion of the outer surface of the body 44. To hermetically seal the threaded connection, an adhesive or epoxy can be used or placed between the threaded outer surface and the threaded inner surface, nut or fastener portion. In another example, the body 44 may incorporate a protrusion or groove that can mate or engage with a corresponding groove or protrusion in the central portion 22 of the weld housing 20 to prevent the body 44 from moving in the weld housing 20. In a further example, the body 44 can include a protrusion or lip that can compress against the weld housing 20 to hold the body 44 in position.

Figure 13:
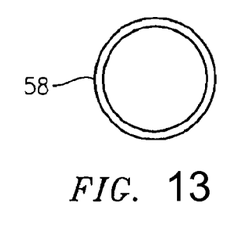
FIG. 13 shows a plan view of an o-ring for use on the body of the sealed wire assembly of FIG. 8.

The outer surface 46 of the body 44 also defines two grooves 48 that are within the central portion 22 of the weld housing 20, when assembled. Each groove 48 receives an o-ring or other similar gasket 58 (as shown in FIG. 13) to create a hermetic seal between the body 44 and the central portion 22 of the weld housing. The o-rings 58 may be a resiliently flexible material such as parker compound C8873-70 available from Parker-Hannifin Corp. of Cleveland, Ohio. In other embodiments, the outer surface 46 of the body 44 may have only one groove 48 to receive an o-ring or 3 or more grooves to receive o-rings. In still further embodiments, the threaded connection embodiment and/or the protrusion embodiment and/or the protrusion and groove embodiment may also be used to form the hermetic seal between the body 44 and the weld housing 20. In additional embodiments, the body 44 does not include grooves 48 and can be compressively or interference fit within the weld housing 20 to form the hermetic seal. In still further embodiments, an adhesive, glue, putty, cyanoacrylate or epoxy may be used to connect the body 44 and the weld housing 20 and/or form the hermetic seal between the body 44 and the weld housing 20. In yet another embodiment, depending on the material used for the body 44, e.g., glass, epoxy or high temperature plastic, the body 44 can be resistance welded into the weld housing 20.

Referring now to FIGS. 8-10, the body 44 may be fabricated from a material such as an epoxy material, a polymer material, a glass material, a ceramic material or any other suitable material and can include passages 60, each of which carries a wire or conductor 42. The wires or conductors 42 do not have any insulation or other protections within the body 44, i.e., the "bare" metal is exposed, except that at each end of the body 44, each of the wires or conductors 42 can have an interface or transition portion with insulation embedded within the body 44 to provide the appropriate protection to the wires or conductors 42 once they extend outside of the body 44. The wires 42 are buried, encased or embedded and fixed in the passages 60 such that the seal around the wires 42 is hermetic. The hermetic seal is formed from the material of the body 44 adhering and/or bonding with the bare metal of the wire or conductor 42. The wires 42 can use insulation and/or protective coatings on both the internal and external sides of the body 44 to provide protection to the metal conductors. For example, the wires 42 can use a polytetrafluoroethylene (PTFE), machine tool wire (MTW), a thermoplastic, high heat-resistant, nylon (THHN), or thermoplastic, heat-resistant wet (THW) insulation or coating. In another embodiment, the wires 42 can have a PTFE inner coating and a machine tool wire (MTW), a thermoplastic, high heat-resistant, nylon (THHN), or thermoplastic, heat-resistant wet (THW) outer coating.

To assemble an embodiment of the feedthrough assembly 10 in the shell of a compressor, an empty weld housing 20 is welded into an opening in the shell 39. The desired number of wires 42 are hermetically embedded in the body 44. The o-rings 58 are placed in the respective grooves 48, and then the inner ends 64 of the wires 42 are connected to the compressor components. The outer ends 66 of the wires 42 are routed or directed through the weld housing 20. The body 44 is disposed or positioned within the weld housing 20 such that the o-rings 58 contact the weld housing 20 to form a hermetic seal with the weld housing 20. To further secure the body 44 in the weld housing 20, the snap ring 56 clips into the slot 54.

It is envisioned that many techniques, now known and later developed, can successfully accomplish the hermetic seals required to practice the present application. For example, the weld housing 20 does not have to be welded to the shell, rather the weld housing 20 could be epoxied, glued, press-fit, form a groove that retains an o-ring or otherwise hermetically affixed within the opening. Similarly, the body 44 could be hermetically sealed within the weld housing 20 simply by being oversized and formed from a material that has sealing properties such that no o-rings are needed, i.e., a compression fit. The compression fit of the body 44 within the weld housing 20 could also provide additional sealing pressure on the wire(s) 42 as well. Epoxy, interference fits, glue and the like could also sealingly hold the body 44 in place.

In one embodiment, the body 44 could also be shaped to be held in place by outward pressure such that the snap ring is unnecessary. In another embodiment, the body 44 can be easily replaced with a new body 44 that includes additional wires in the event that additional electrical power or control connections are desired (see e.g., FIG. 2). In the case where the compressor shell is thick enough, such as to accommodate a flammable refrigerant, the body 44 may be sized and configured to directly seal to the shell without a weld housing 20.

In one embodiment, the wires or conductors 42 can have a non-linear path or passage through the body 44. The use of the non-linear path can enable a wire 42 to exit the body 44 at a location other than the end of the body, e.g., the side of the body, to simplify wiring connections on either or both of the inside and outside of the compressor shell.

Figure 14:
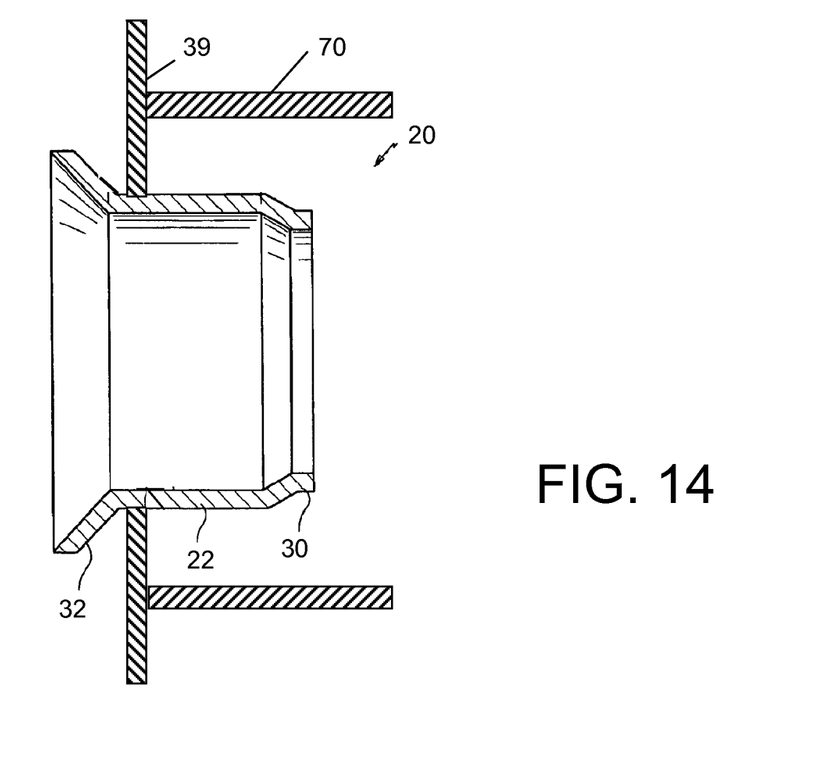
FIG. 14 shows an embodiment of a side, cross-sectional view of a weld housing mounted in a compressor shell with a protective shield.

In one embodiment, the distance the components of the feedthrough assembly 10, e.g., the outer neck 30 and/or the body 44, project from the compressor shell 39 can be minimized to reduce the possibility of damage to the components from contact during handling or other operations. In another embodiment as shown in FIG. 14, a protective shield 70 can be connected to the compressor shell 39 and surround the outer portions of the feedthrough assembly 10 to protect the feedthrough assembly components from contact and damage. The protective shield 70 can have any suitable cross-sectional shape, e.g., circle, oval, square, rectangle, etc. In another embodiment, the protective shield 70 may not surround a full 360 degrees around the components of the feedthrough assembly 10 to permit better access to the feedthrough assembly 10. In still another embodiment, the shield 70 may have a cover that is parallel to the compressor shell 39 to provide additional protection to the feedthrough assembly 10. The cover can include an opening or other features to permit the passage of the wires from the feedthrough assembly 10.

Figure 15:
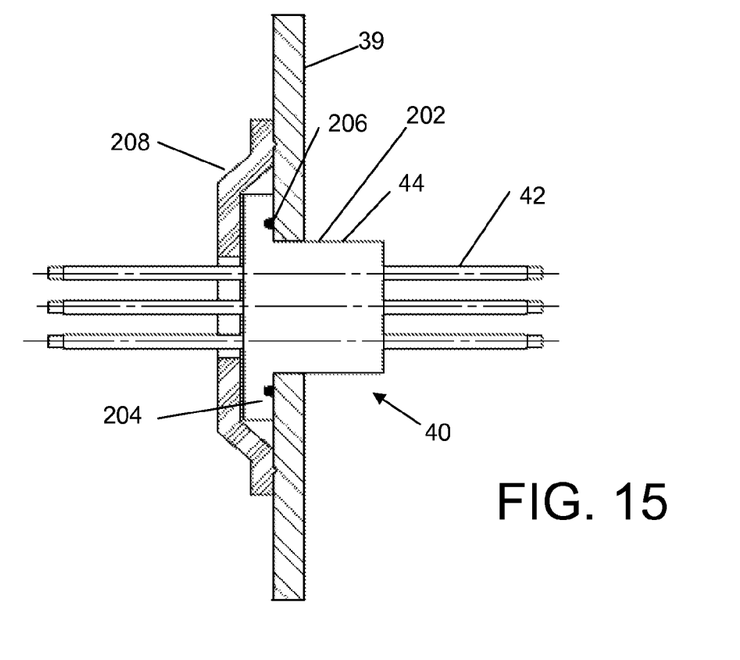
FIGS. 15-17 show partial cross-sectional views of embodiments of the sealed wire assembly positioned in the compressor shell.
Figure 16:
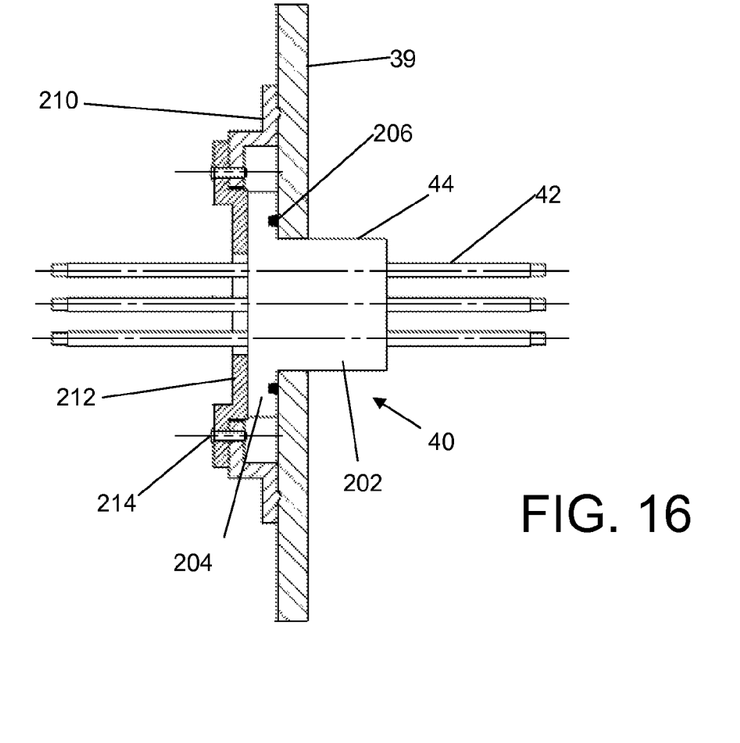
Figure 17:
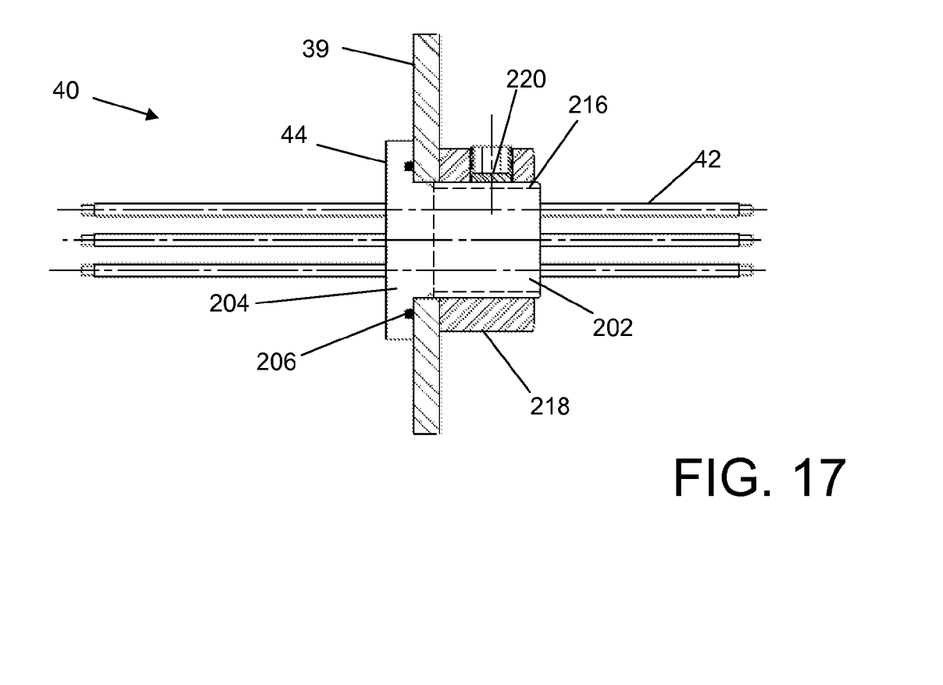

In another embodiment, the wire assembly 40 can be mounted and hermetically sealed in the compressor shell 39 without the use of the weld housing 20. As shown in FIGS. 15-17, the wire assembly 40 passes through an opening in the compressor shell 39 and can be mounted and hermetically sealed using any suitable technique. The wire assembly 40 of FIGS. 15-17 can have a body 44 with a first portion 202 having a first dimension corresponding to the opening in the compressor shell and a second portion 204 having a second dimension greater than the opening in the compressor shell 39. The first portion 202 is sized to permit the first portion 202 to pass through the opening in the compressor shell 39 and the second portion 204 is sized to stop axial movement of the body 44 from the compressor shell 39. As shown in FIGS. 15-17, to form the hermetic seal between the body 44 and the inner surface of the compressor shell 39, an o-ring, gasket, polymer material or other sealing device 206 can be placed between the second portion 204 and the compressor shell and compressed to form the hermetic seal. As shown in FIG. 15, a plate 208 can be connected to the compressor shell 39 and used to compress the body 44 and o-ring 206 to form the hermetic seal and retain the body 44 in position. The plate 208 can have a center opening to permit the passage of the wires 42 to the internal components of the compressor. The plate 208 can be made from a single, integral piece or can be formed from a plurality of separate pieces.

As shown in FIG. 16, one or more tabs 210 can be connected to the compressor shell 39 near the opening for the body 44. A cover 212 can connect to the tab(s) 210 to compress the body 44 and o-ring 206 to form the hermetic seal and retain the body 44 in position. The cover 212 can connect to the tabs 210 using a fastening device such a bolt, screw or rivet 214. The cover 212 can have a center opening to permit the passage of the wires 42 to the internal components of the compressor. The cover 212 can be made from a single, integral piece or can be formed from a plurality of separate pieces.

As shown in FIG. 17, a threaded connection 216 between the body 44 and a fastener 218, e.g., a nut, can be used to compress the o-ring 206 to form the hermetic seal between the o-ring 206 and the compressor shell 39 and retain the body 44 in the opening. The outer surface of the first portion 202 of the body 44 can be threaded to mate with a threaded inner surface of the fastener 218. The fastener 218 can be held in position by an optional set screw 220 or other similar fastening device that engages the body 44. In the embodiments of FIGS. 15-17, the second portion 204 of the body 44 is located inside the compressor shell 39, however, in other embodiments, the configurations of FIGS. 15-17 can be reversed and the second portion 204 of the body 44 can be located outside of the compressor shell 39.

Figure 18:
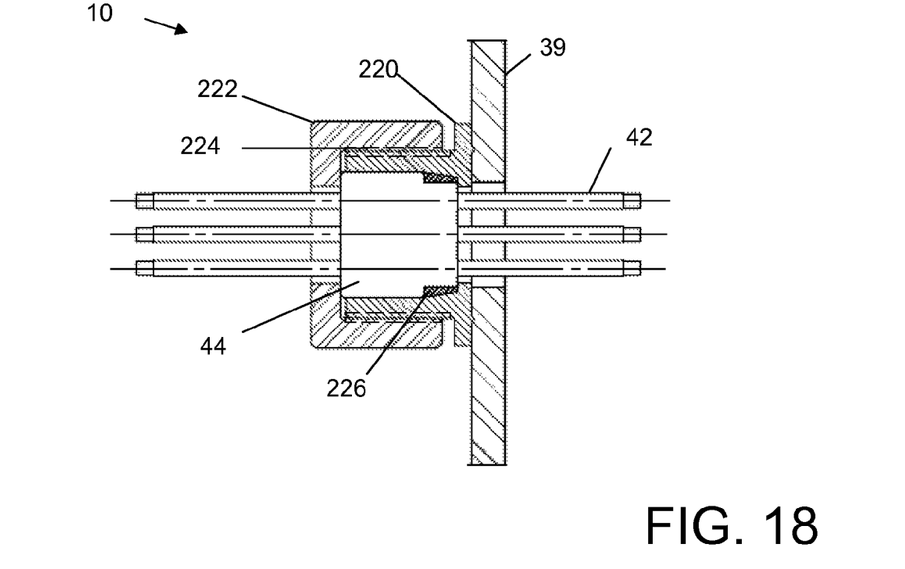
FIGS. 18 and 19 show partial cross-sectional views of embodiments of the feedthrough assembly using a compression fitting.
Figure 19:
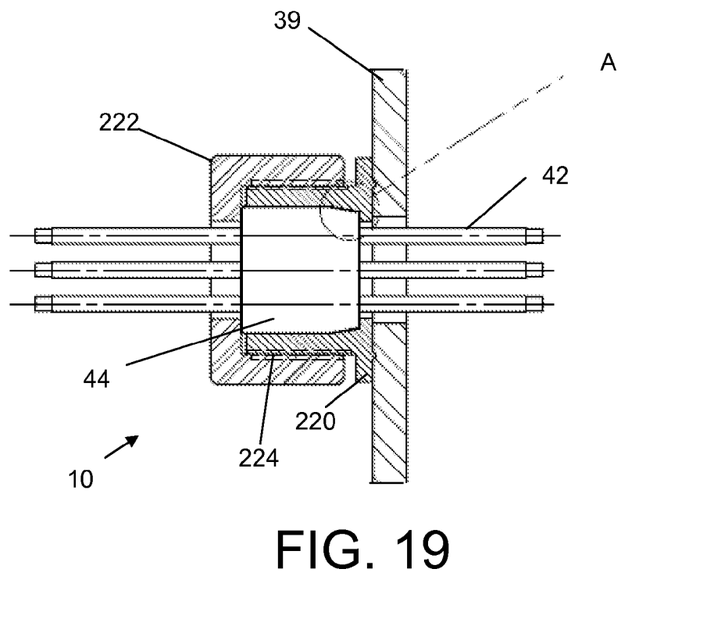
Figure 20:
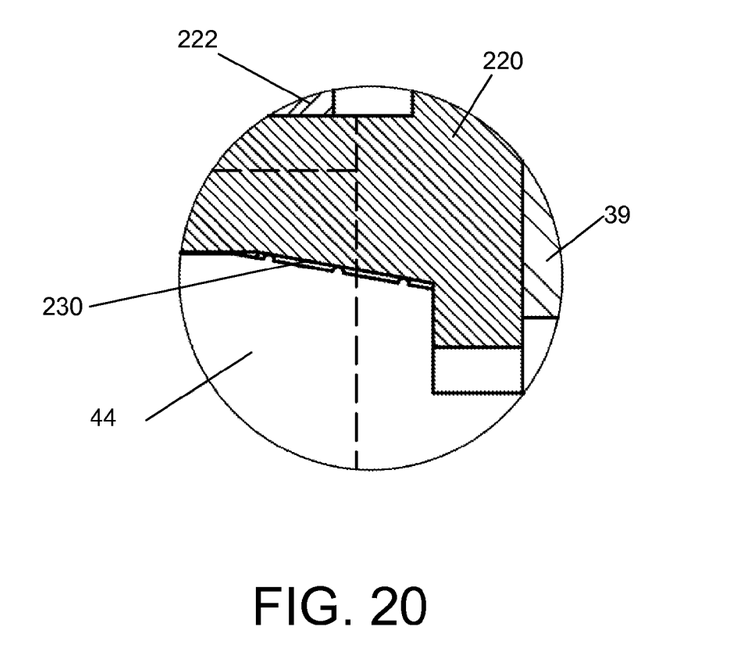
FIG. 20 shows an enlarged view of section A from FIG. 19.

FIGS. 18-20 show embodiments of the feedthrough assembly 10 using compression fittings. A fitting 220 can be welded or attached to the inner surface of the compressor shell 39. The body 44 can be positioned in the fitting 220 and can be compressed by a fastener or nut 222 to hold the body 44 in position. The fastener 222 compresses the body 44 through a threaded connection 224 with the fitting 220. The fastener 222 can have a center opening to permit the passage of the wires 42 to the internal components of the compressor. In FIG. 18, the body 44 can be hermetically sealed within the compressor shell 39 by the compression of a ferrule 226 into the fitting 220 when the fastener 222 is connected. The ferrule 226 can be positioned on the outer surface of the body 44 and can be compressed by the body 44 as the fastener 222 is connected to the fitting 220. In FIGS. 19 and 20, the body 44 can be hermetically sealed in the compressor shell 39 by the compression of ribs 230 when the fastener 222 is connected. The ribs 230 can be positioned on the inner surface of the fitting 220 and can be compressed by the body 44 as the fastener 222 is connected to the fitting 220.

In another embodiment, additional items or components can be embedded in the body 44 to provide additional strength and/or functionality to the body 44. For example, a sleeve can be embedded in the body to improve the rigidity of the body 44 and depending on the configuration of the sleeve to possibly be used to form an interference or compression fit with the weld housing 20.

In one embodiment, terminals or pins can be embedded or encased in the body 44 instead of wires. The connecting wires can then be connected to the terminals using conventional techniques such as plugs or connectors. For example, slide-on T-blocks could be used to connect the motor on the inside with standard wire/insulation connections on the outside. However, in another embodiment, the motor wire(s) could be connected to the pins or terminals on the inside and a slide-on wiring harnesses, with or without 0.250 inch tabs, could be used for connections on the outside.

In another embodiment, multiple bodies 44 can be used for electrical connections inside the shell, with each body 44 having one or more embedded wires 42. The multiple bodies 44 can be positioned in corresponding weld housings 20 and/or in corresponding openings in the compressor shell 39. In another embodiment, the multiple bodies 44 can be positioned, sealed and retained within a single weld housing 20. In still another embodiment, the feedthrough assembly 10 can use a split, i.e., 2 piece, assembly that is pressed together to form the hermetic seal of the body 44 with respect to the compressor shell 39. The pieces can be pressed together, e.g., inside to outside, to secure the feedthrough assembly 10 in the compressor shell 39 and prevent axial movement of the body 44 in both directions, i.e., inside and outside. The hermetic seal can be formed by the compression of o-rings or other sealing devices against both the internal and external surfaces of the compressor shell 39 as the pieces are pressed together. In one embodiment, an adhesive or sealant can be used when pressing the pieces together to further provide a hermetic seal.

In a further embodiment, the centerline of the feedthrough assembly 10 can be positioned at an angle of less than 90 degrees or greater than 90 degrees with respect to the compressor shell to permit the wires 42 to be more easily routed and connected.

As would be appreciated by those of ordinary skill in the pertinent art, the functions of several elements of the present application may, in alternative embodiments, be carried out by fewer elements, or a single element. Similarly, in some embodiments, any functional element may perform fewer, or different, operations than those described with respect to the shown embodiment. Also, functional elements shown as distinct in the drawings may be incorporated within other functional elements, separated in different hardware or distributed in various ways in a particular implementation. Further, relative size and location are merely somewhat schematic and it is understood that not only the same but many other embodiments could have varying depictions.

All relative descriptions herein such as above, below, left, right, up, and down are with reference to the Figures, and not meant in a limiting sense. Relative descriptions such as inner and inward are with reference to being a direction toward the interior of a compressor shell whereas outer and outward are a direction away from the compressor. The shown feedthrough assemblies can be understood as providing exemplary features of varying detail of certain embodiments, and therefore, components, modules, elements, and/or aspects of the illustrations can be otherwise added to, combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

It is important to note that the construction and arrangement of the present application as shown in the various exemplary embodiments is illustrative only. Although only a few embodiments have been described in detail in this application, those who review this application can readily appreciate that many modifications are possible (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter described in the application. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims.

Furthermore, in an effort to provide a concise description of the exemplary embodiments, all features of an actual implementation may not have been described (i.e., those unrelated to the presently contemplated best mode of carrying out the invention, or those unrelated to enabling the invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. An assembly for a compressor, the assembly comprising:
a housing being connectable to a shell of the compressor, the housing comprising a passageway; and
a wire assembly, the wire assembly comprising:
a body positioned in the passageway and connected to the housing to form a hermetic seal between the housing and the body; and
a plurality of wires embedded in the body, each wire of the plurality of wires being individually hermetically sealed by the body and having a first end connectable to an internal component of the compressor and a second end opposite the first end connectable to a component external to the compressor,
wherein a connection between the body and the housing is a threaded connection such that a threaded surface of the body is mated with a threaded surface of the housing.

2. The assembly of claim 1 wherein the threaded connection between the body and the housing includes an adhesive to form the hermetic seal.

3. The assembly of claim 1 wherein the threaded connection between the body and the housing includes an adhesive connection.

4. The assembly of claim 3 wherein the adhesive connection comprises at least one of a glue, an epoxy, a cyanoacrylate or a putty contacting both the body and the housing.

5. The assembly of claim 1 wherein the threaded surface of the body is an outer surface of the body.

* * * * *